United States Patent [19]

Gall

[11] Patent Number: 4,881,924
[45] Date of Patent: Nov. 21, 1989

[54] YOKE FOR HOOKES-TYPE UNIVERSAL JOINT

[75] Inventor: Ray A. Gall, Toledo, Ohio

[73] Assignee: Dana Corporation, Toledo, Ohio

[21] Appl. No.: 255,710

[22] Filed: Oct. 7, 1988

Related U.S. Application Data

[63] Continuation-in-part of Ser. No. 129,765, Dec. 7, 1987, abandoned.

[51] Int. Cl.$^4$ .................................................. F16D 3/40
[52] U.S. Cl. ........................................ 464/134; 403/57
[58] Field of Search .................... 403/57, 58; 464/134, 464/135, 136

[56] References Cited

U.S. PATENT DOCUMENTS 4,192,153  3/1980  Fisher ................................. 464/134

FOREIGN PATENT DOCUMENTS 74625  3/1983  European Pat. Off. ............ 464/134

*Primary Examiner*—Daniel P. Stodola
*Attorney, Agent, or Firm*—Willian Brinks Olds Hofer Gilson & Lione

[57] ABSTRACT

A ferrous metal yoke for a universal joint, the yoke having a central axis, an annular hub and spaced-apart arms extending from an end of the hub on opposite sides of the central axis. The arms have coaxial openings extending therethrough for pivotably receiving the opposed arms of a first pair of arms of a cruciform-shaped journal cross, and each of the arms of the yoke is provided with a shear center which is positioned between such arm and the central axis of the yoke to provide corresponding or closely corresponding free deflection characteristics under torsional load around the central axis between the arms of the yoke and the arms of the journal cross which are received therein. Such shear center characteristics are obtained by constructing each arm of the yoke with a portion between the end of the hub and the opening in such arm in the shape of an outwardly facing "C" in transverse cross-section, with a generally planar web portion and spaced-apart flange portions extending perpendicularly outwardly from the web portion and generally parallel to each other.

7 Claims, 3 Drawing Sheets

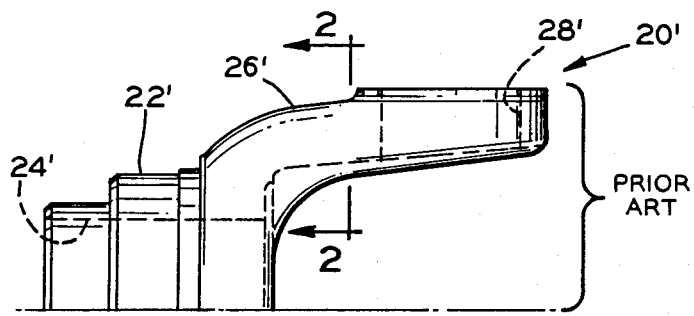
FIG. IA
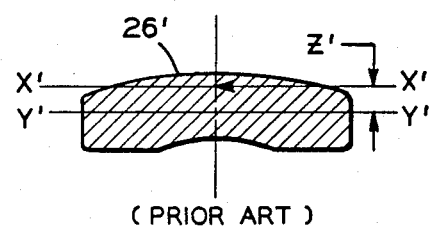
FIG. 2
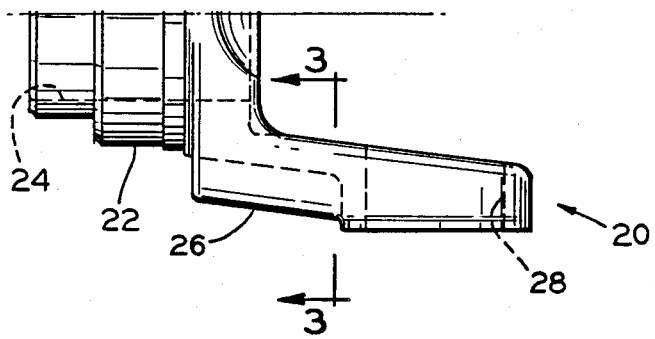
FIG. IB
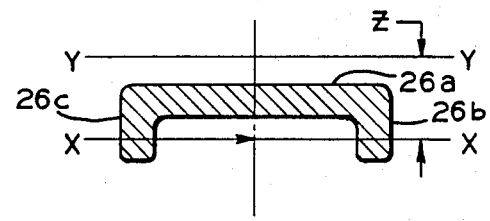
FIG. 3
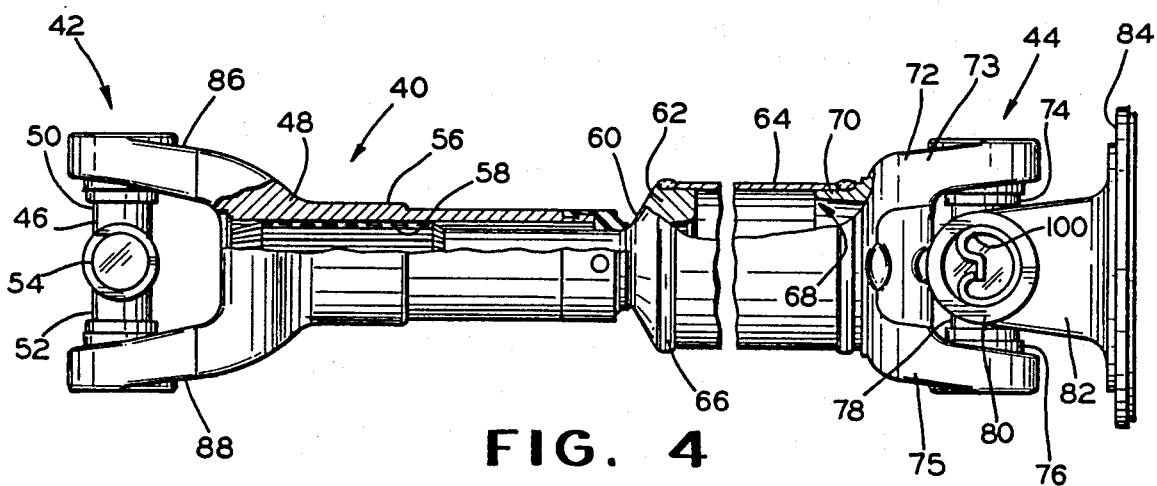
FIG. 4

YOKE FOR HOOKES-TYPE UNIVERSAL JOINT

CROSS-REFERENCE TO RELATED APPLICATION

This application is a continuation-in-part of my co-pending U.S. Patent application Ser. No. 129,765, now abandoned.

BACKGROUND OF THE INVENTION

This invention relates to a yoke for a Hookes-type universal joint. More particularly, this invention relates to a ferrous metal yoke of reduced weight and enhanced flexibility for such a universal joint.

As is known in the prior art, a Hookes-type universal joint is made up of a yoke with a pair of spaced-apart members, which are usually called arms or ears. Each of such arms or ears has a cross hole extending therethrough, and the openings in such arms or ears are coaxial with one another. A universal joint of this type also includes a cross member, which is usually called a journal cross, a trunnion or a spider, and which has a first pair of opposed, coaxial arms that are pivotably mounted, respectively, in the openings of the arms of the yoke. A universal joint of this type further includes a third member, which may be a second yoke, with a pair of spaced-apart arms with coaxial cross holes extending therethrough, in which a second pair of opposed, coaxial arms of the journal cross are pivotably mounted, the axis of the second pair of opposed, coaxial arms of the journal cross extending perpendicularly to the axis of the first pair. The purpose of such a universal joint is to transmit torque from a driving member, to which one of the first yoke and second yoke is connected, to a driven member, to which the other of the first yoke and second yoke is connected, when there is or may be a non-coaxial relationship between the axis of rotation of the driving member and the axis of rotation of the driven member. An axial misalignment condition between the axis of rotation of the driving member and the axis of rotation of the driven member may be accommodated by the use of a multiplicity of Hookes-type universal joints between the driving member and the driven member with an intermediate driven member between each pair of universal joints. Universal joints of the type described, in various forms, are in widespread use in front engine, rear wheel driven automobiles and trucks in connection with the driveshaft assembly which is used to transmit torque from the transmission of such a vehicle to the differential thereof, to accommodate a non-coaxial relationship between the axis of rotation of the output shaft of the transmission and the axis of rotation of the input shaft of the differential, especially as the relationship between such axes is subject to change during the operation of the vehicle due to the effects of the suspension system of the vehicle.

Known types of Hookes-type universal joint yokes of the aforesaid character include yokes which are made from ferrous metal, for example, from cast iron or from forged steel, and yokes which are made from lightweight metals such as aluminum and aluminum alloys, as determined by the desired strength, deflection and weight characteristics of any such yoke, and by whether it is desired or required to be able to weld another element of the drive assembly thereto, an operating requirement which dictates the use of a forged steel yoke. Of course, since the modulus of elasticity of a ferrous metal yoke exceeds that of an aluminum or aluminum alloy yoke by a factor of nearly 3.0 (30,000,000 p.s.i. as opposed to 10,300,000 p.s.i.), and since the modulus of elasticity of a cast iron yoke (23,000,000 p.s.i.) is also considerably greater than that of an aluminum or aluminum alloy yoke, the arms of a forged steel yoke or a cast iron yoke will be considerably more rigid and considerably less subject to deflection and distortion under the torque loads that are encountered during the normal operation of a universal joint than the arms of a similar aluminum or aluminum alloy yoke. This can be a problem in the design of a universal joint because of the distortion or deflection of the journal cross element of the joint which results from the torque loads that are imposed thereon during the operation of the universal joint. Such distortion or deflection tends to misalign the axes of the originally coaxial opposed arms in each pair of the arms of the journal cross. Heretofore, in universal joints of the type employing cast iron or forged steel yokes, the yoke has been rather massive in order to minimize the distortion and deflection of the arms of such yoke under the torsional loads that are imposed on the arms during the operation of the universal joint, thus restraining the deflection and distortion of the arms of the journal cross which are engaged in such yoke. However, this approach results in locally unbalanced loads which are imposed on the annular bearings that customarily rotatingly separate the yoke arms and the journal cross arms and on the needle bearing components of such annular bearings, an effect which can lead to premature bearing failure, and results in a yoke with rather massive arms. The massiveness of the arms of prior art ferrous metal universal joint yokes which results from the need to minimize yoke and journal cross distortion under torsional load adds to the weight and the material cost of the yoke and the universal joint which incorporates such yoke.

SUMMARY OF THE INVENTION

According to the present invention, there is provided a ferrous metal yoke for a Hookes-type universal joint, and a Hookes-type universal joint which incorporates such yoke, in which each of the arms of the yoke is designed with a shear center (or "flexural center" as it is sometimes referred to) that is inward of such arm, that is, between the arm and the axis of rotation of the yoke which incorporates such arm. This design feature provides such arm with torsional load deflection and distortion characteristics that match the torsional load deflection and distortion characteristics of the arm of the journal cross of such universal joint which is received in such arm of the yoke. The arm of the yoke of the present invention can be provided with such shear center characteristics by constructing at least a portion of the arm which leads up to the journal opening leading therethrough generally in the shape of an outwardly facing "C" having a generally planar web portion which extends parallel to the axis of rotation of the yoke and with spaced-apart, generally planar flange portions extending parallel to one another and outwardly from the web portion and generally perpendicularly with respect to the web portion. By moving the shear center of the yoke arm inwardly in this matter, the twisting movement of the torsional load that is imposed on such arm is increased, which increases the twisting of the arm under torsional load, making it possible to match the free deflection and distortion characteristics of the arm of a journal cross which is received therein, and at the same time it is possible to reduce the amount of material in the arms of the yoke and, thus, the weight and cost of the yoke. Further, the reduction of the material in the arms of the yoke inceases the lateral displacement of the arms under torsional load, and this also makes the behavior of the arms of the yoke under torsional load more compatible with that of the arms of the journal cross. European Patent EP 074 625 does show a yoke with arms which are C-shaped in cross-section, and this will increase the lateral deflection of the arms under torsional load in comparison to that of a shearing of a standard yoke. However, the C-configuration of the arms of the yoke faces inwardly which has the effect of causing the twisting of each arm under shear loads to be opposite in direction to that desired by moving the shear center outward thereof. The invention of the present application is applicable to a variety of styles of yokes for Hookes-type universal joints which are used in the driveshaft assemblies of front engines, rear wheel driven automobiles and trucks, for example, a tube yoke, a slip yoke and an end yoke.

BRIEF DESCRIPTION OF THE DRAWING

FIG. 1A is an elevational view of a part of yoke for a universal joint, the illustrated arm of such yoke being constructed in accordance with the prior art;

FIG. 1B is an elevational view of a part of a yoke for a universal joint, the illustrated arm of such yoke being constructed in accordance with the teachings of the present invention;

FIG. 2 is a sectional view taken on line 2—2 of FIG. 1A;

FIG. 3 is a sectional view taken on line 3—3 of FIG. 1B;

FIG. 4 is an elevational view, partly in cross-section, of a drive assembly for an automotive vehicle, which drive assembly incorporates a multiplicity of universal joint yokes according to the present invention;

DETAILED DESCRIPTION OF THE PREFERRED EMBODIMENT

Figure 5:
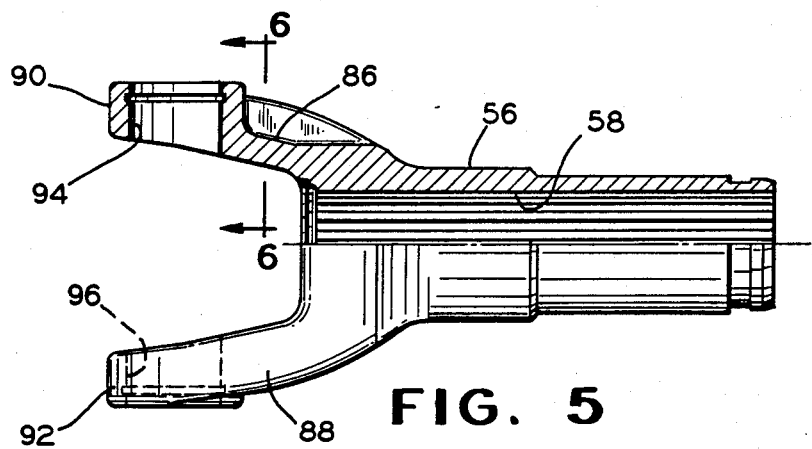
FIG. 5 is an elevational view, partly in cross-section, of one of the universal joint yokes illustrated in FIG. 4.

FIGS. 1A and 1B, respectively, illustrate opposed one-half portions of a Hookes-type universal joint, the portion in FIG. 1A being generally indicated by reference numeral 20 and being constructed according to the prior art, the portion in FIG. 1B being generally indicated by reference numeral 20' and being constructed according to the embodiment of the present invention. The yoke 20, 20' is in a configuration which is commonly described as an end yoke, and is constructed of a heavy, relatively rigid ferrous metal such as cast iron or forged steel. The yokes 20 and 20', respectively, are provided with an annular hub portion 22, 22' with a bore 24, 24' extendinig therethrough. The annular hub portion 22,22' has a central axis which is the axis of rotation of the yoke 20, 20' during the operation of a universal joint incorporating such yoke, and the yoke 20, 20' further has a pair of spaced-apart arms 26, 26', only one of which is illustrated in each of FIGS. 1A and 1B, extending from an end of the hub portion 22, 22' generally parallel to each other and to the axis of rotation of the yoke 20, 20'. The arm 26' of the yoke 20' corresponds to the teachings of the prior art, and the arm 26 of the yoke 20 corresponds to the present invention. The arm 26 has a bore 28 which extends therethrough, and the arm 26' has a bore 28' which extends therethrough. The bores 28 and 28', when the yoke 20, 20' is in a no-load condition, are coaxial with the opposed arms of such yoke, they extend perpendicular through the axis of rotation of the yoke 20, 20', and they receive annular bearings, not shown, which, in turn, receive the ends of an opposed pair of arms of a conventional cruciform-shaped journal cross.

In the operating condition of the arm 26', a force resultiing from a torsional load applied to the yoke 20' will be applied thereto and will act along an axis $x'$-$x'$. Such arm 26' will have a shear center which will reside along an axis $y'$-$y'$, and the deflection of the arm 26' under the force acting at axis $x'$-$x'$ will be a function of the twisting moment arm of the arm 26', which is the distance of $z'$ between the axis $x'$-$x'$ and the axis $y'$-$y'$ (as well as a function of other design features such as the length of the arm and the design of the connection of the arm to the hub). As is clear from FIG. 2, the distance $z'$, or twisting moment arm, of a universal joint yoke arm of conventional construction is small, which indicates that such arm will experience very little deflection or distortion under torsional load, and this deflection or distortion will tend to be considerably less than the free deflection of the arm of the journal cross 30 which is journaled therein, which will tend to impose substantially imbalanced loads on an annular bearing positioned between such journal cross arm and universal joint yoke arm.

The aforesaid problems with respect to the FIG. 2 prior art construction are obviated by the use of the arm 26, which, as is shown in FIG. 3, is generally C-shaped in cross-section with a generally planar web portion 26a and with spaced-apart flange portions 26c and 26b extending perpendicularly outwardly from the ends of the web portion 26a and parallel to one another. The shear center of the arm 26, thus, will be positioned substantially inwardly of the arm 26, toward the axis of rotation of the universal joint yoke incorporating such arm, and in the embodiment illustrated in FIG. 3, such shear center will be along an axis $y$-$y$. While the design of the arm 26, thus, shifts the shear center of such arm with respect to its location in an arm corresponding to that of the arm 26', such design does not similarly shift the locaton of a force resulting from a torsional load which acts thereon, which, in the embodiment of FIG. 3, will act along an axis $x$-$x$. Thus, in relationship to the construction of arm 26' of the prior art, as illustrated in FIG. 2, the arm 26 according to the present invention, as is shown in FIG. 3, will have a substantially greater twisting moment arm $z$, and will, thus, be subject to considerably more twisting under torsional load than the arm 26' of the prior art. Thus, the arm 26 will twist under torsional load, in the same direction as the normal deflection of the arm of a journal cross, thereby relieving localized loads on the arm of the journal cross and on the bearing (not shown) in the arm 26 which rotatingly receives the arm of the journal cross. Further, the arm 26 will move laterally under a torsional load to a greater extent than the arm 26', because of the reduced amount of material in the arm 26 in comparison to the arm 26', and this will also serve to help reduce localized loads on the arm of the journal cross and the bearing in which it is received.

As is illustrated in FIG. 4, a drive assembly, generally indicated by reference numeral 40, is provided to transmit torque from an input end 42 of such drive assembly to an output end 44 thereof. The drive assembly 40 of FIG. 4 is of a type which is used in transmitting torque form the transmission of a front engine, rear wheel drive automotive vehicle, and the input end 42 may be considered to be the end which is adapted for attachment to the transmission of the vehicle. Thus, the output end 44 of the drive assembly 40 is adapted for attachment to the differential of such vehicle.

The drive assembly 40 includes a first yoke 48, which is of the slip-yoke type, and which has the opposed arms of a first pair of arms 50 and 52 of a first journal cross 46 pivotably received in the spaced-apart arms of such yoke 48. The universal joint which incorporates the yoke 48 and the first journal cross 46 normally incorporates another element, which may be another yoke, not shown, whose spaced-apart arms receive the opposed arms of another pair of arms of the journal cross 46, only one of such arms, 54, being shown in the drawing. The yoke 48 is shown as including an elongate annular hub portion 56, the interior of such hub portion 56 having an internal spline, as is known in the art. The drive assembly 40 further includes a member 60 having a shaft portion that is slidingly received in the internal spline portion 58 of the yoke 48 and the member 60 has an enlarged end portion 62. The drive assembly 40 further includes a tubular member 64, has a first end that is telescoped over the enlarged end portion and is welded thereto at 66.

An opposed end of the tubular member 64 is telescoped over an end 68 of an annular hub 70 of a second yoke 72. The second yoke, 72, which is of the tube yoke type and which must be made from a steel forging to permit the opposed end of the tubular member 64 to be welded thereto, has spaced apart arms 73 and 75 and receives a first pair of opposed arms 74 and 76 of a journal cross 78. Further, the second journal cross 78 includes a second pair of opposed arms, only one of which, arm 80, is shown in the drawing. The second pair of opposed arms extends transversely of the first pair of arms 74, 76 of the journal cross 78 and the arms of the second pair are pivotably received, respectively, in a spaced-apart pair of arms, only one of which is shown, which are attached to a flange 84 and which, in turn, is attached to the differential, not shown, of the vehicle. In the construction of the yoke 72, the juncture between the arms 73 and 75 and the annular hub portion 76 should have sufficient thickness, in a transversely extending plane, to be free from deflection according to the characteristics of a thin plate, and there should be a relatively short radius at the juncture of each of such arms and the annular hub portion. These design criteria apply to any yoke according to the present invention.

Figure 6:
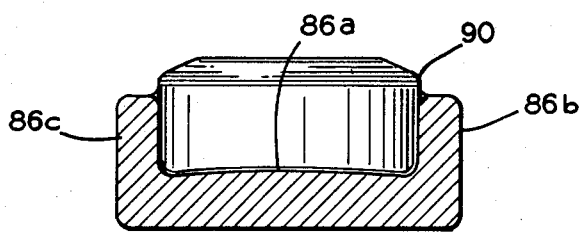
FIG. 6 is a cross-sectional view, taken on line 6—6 of FIG. 5.

The yoke 48 is shown in greater detail in FIGS. 5 and 6 and includes a pair of spaced-apart arms 86 and 88 which extend from the same end of the elongate hub portion 56 toward the input end 42 of the drive assembly 40 and which are formed integrally, in a single piece, with the hub portion 56 from a ferrous metal such as forged steel or cast iron. The arms 86 and 88 of the yoke 48 are similar in design, and as is shown particularly in connection with the arm 86 in FIG. 6, each of them has a C-shaped configuration to provide a shear center which is located inwardly of such arm and which, therefore, results in a greater moment arm for the torsional loads which act thereon during the operation of the first universal joint. As was explained in connection with the arm 26 of FIG. 1B, this arrangement of the shear center of the arms 86 and 88 will result in a free deflection of each of the arms 86 and 88 corresponding or closely corresponding to the free deflection of the journal cross whose arm is received in the journal therein. Thus, the arm 86 has a generally planar web portion 86a and a pair of spaced-apart flange portions 86b and 86c which extend generally perpendicularly outwardly from the web portion 86a and which are generally parallel to each other. Further, each of the arms 86 and 88 is provided with an enlarged end portion, designated, respectively, as reference numerals 90 and 92, the end portions 90 and 92, respectively, having bores 94 and 96 extending therethrough for receiving the annular bearings, not shown, which permit the pivoting of the arms of the journal cross 78 therein. The bores 94 and 96 of the arms 86 and 88 have an enlarged retaining groove 98 therein to retain an externally locating type of retaining ring (not shown) to accurately position an annular bearing (not shown) within such bore.

Figure 7:
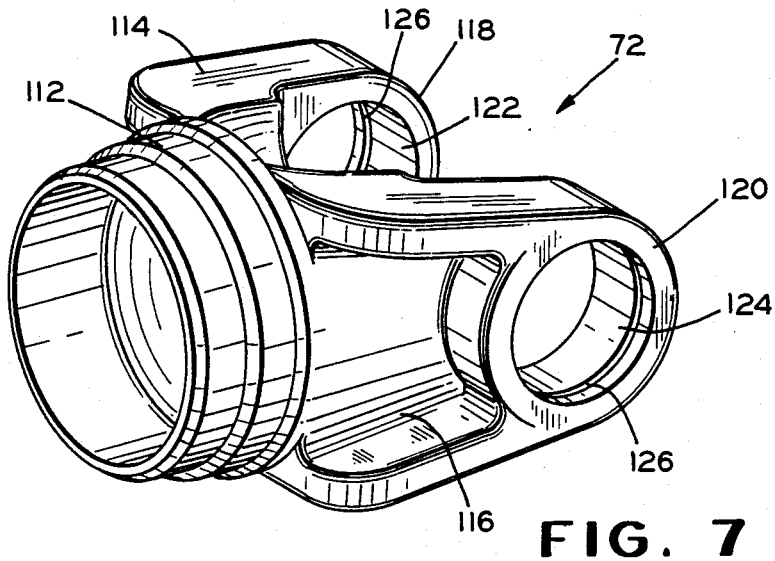
FIG. 7 is a perspective view of another of the universal joint yokes illustrated in FIG. 4.
Figure 8:
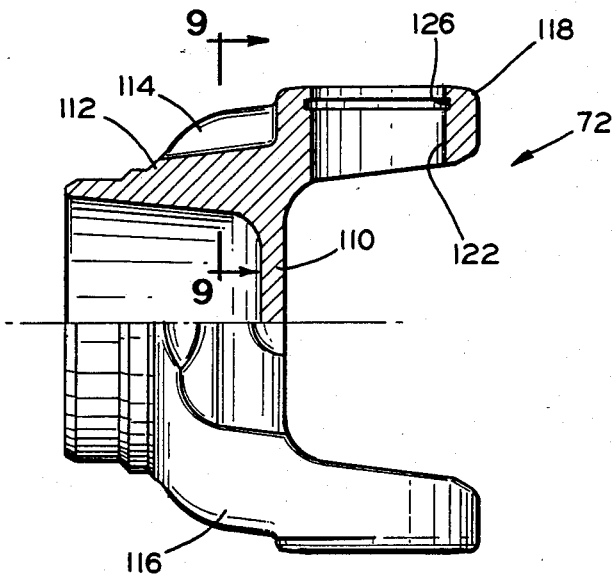
FIG. 8 is an elevational view, partly in cross-section, of the universal joint yoke illustrated in FIG. 7.
Figure 9:
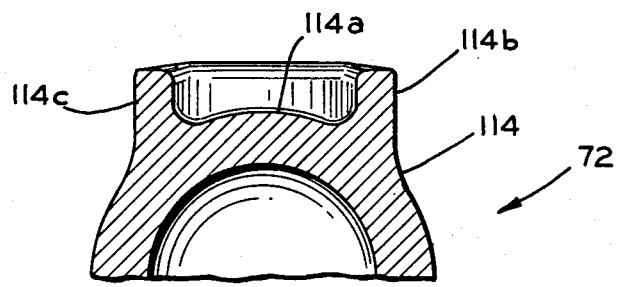
FIG. 9 is a cross-sectional view taken on line 9—9 of FIG. 8.

FIGS. 7, 8 and 9 illustrate the universal joint yoke 72 of FIG. 4. The yoke 72 includes an annular hub portion 112, which is blocked at an end thereof by a transversely extending web portion 110, and a pair of spaced-apart arms 114 and 116 which extend from the blocked end of the hub portion 112 and are formed integrally in a single piece with the hub portion 112 from a ferrous metal such as forged steel or cast iron. The arms 114 and 116 of the yoke 72 are similar in design, and as is shown particularly in connection with the arm 114 in FIGS. 8 and 9, each of them has an outwardly facing C-shaped configuration to provide a shear center which is located inwardly of such arm and which, therefore, results in a greater moment arm for the torsional loads which act thereon during the operation of the universal joint which incorporates the yoke 72. As was explained in connection with the arm 26 of FIG. 1B, this arrangement of the shear center of the arms 114 and 116 of the yoke 72 will result in a free deflection of each of the arms 114 and 116 corresponding or closely corresponding to the free deflection of the journal cross whose arm is received in the journal therein. Thus, the arm 114 has a web portion 114a and a pair of spaced-apart flange portions 114b and 114c which extend generally perpendicularly outwardly from the web portion 114a and which are generally parallel to each other. Further, each of the arms 114 and 116 is provided with an end portion, designated, respectively, by reference numerals 118 and 120, having bores 122 and 124, respectively, extending therethrough. Each of the bores 122 and 124 is adapted to receive an annular bearing, not shown, which permits the pivoting of the opposed arms of a journal cross, not shown, therein, each of the bores 122 and 124 having an enlarged retaining groove 126 therein to retain an externally locating type of retaining ring (not shown) to accurtely position the annular bearing within such bore.

Figure 10:
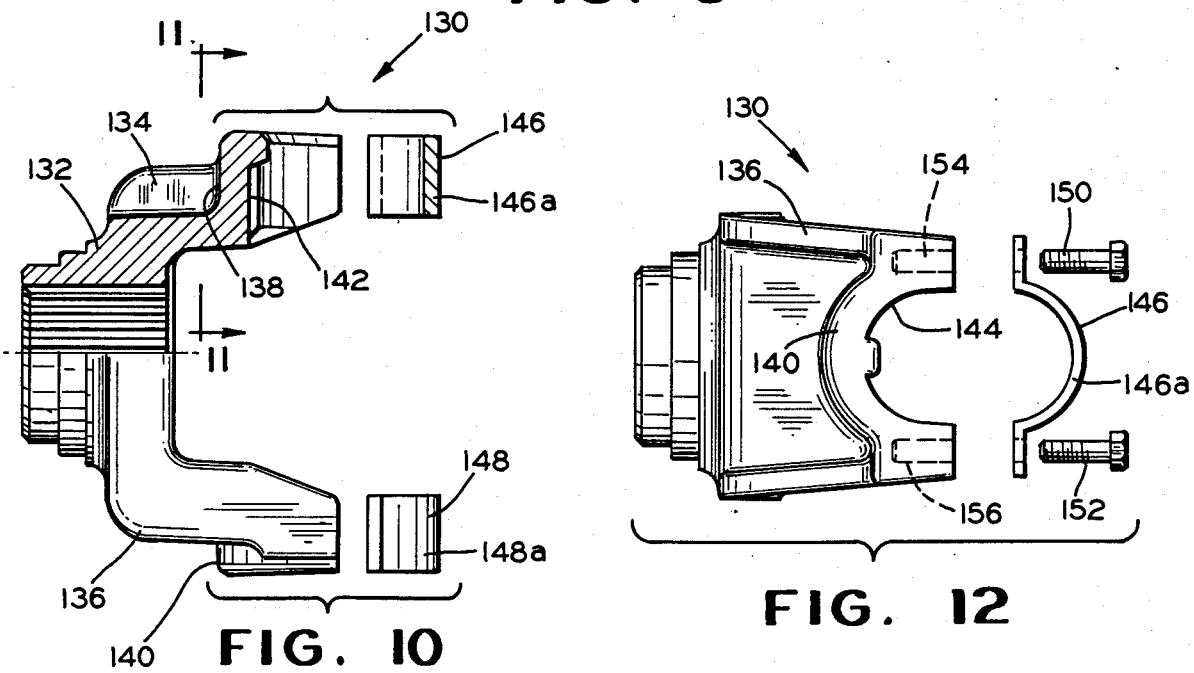
FIG. 10 is an elevational view, partly in cross-section, of yet another of the universal joint yokes illustrated in FIG. 4.
Figure 12:
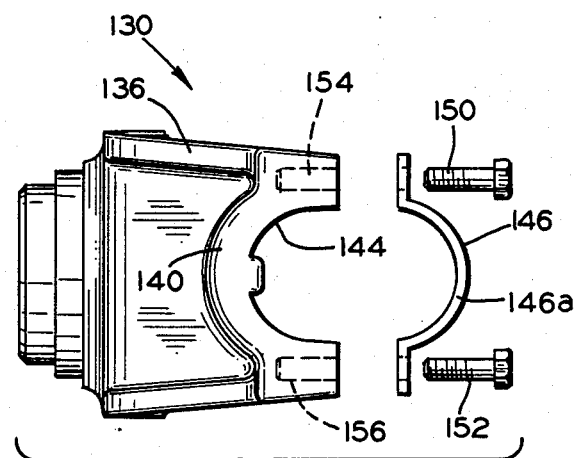
FIG. 12 is an end elevational view of universal joint yoke of FIGS. 10 and 11.
Figure 11:
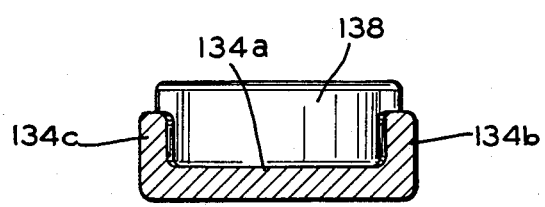
FIG. 11 is a sectional view taken on line 11—11 of FIG. 10.

FIGS. 10, 11 and 12 illustrate a universal joint yoke according to the present invention which is generally identified by reference numeral 130 and which is of the end-yoke type. The yoke 130 includes an annular hub portion 132 and a pair of spaced-apart arms 134 and 136 which extend from an end of the hub portion 132, and which are formed integrally in a single piece with the hub portion 132 from a ferrous metal such as forged steel or cast iron. The arms 134 and 136 of the yoke 130 are similar in design, and as is shown particularly in connection with the arm 134 in FIG. 11, each of them has an outwardly facing C-shaped configuration to provide a shear center which is located inwardly of such arm and which, therefore, results in a greater moment arm for the torsional loads which act thereon during the operation of the universal joint incorporating the yoke 130. As was explained in connection with the arm 26 of FIG. 1B, this arrangement of the shear center of the arms 134 and 136 will result in a free deflection of each of the arms 134 and 136 corresponding or closely corresponding to the free deflection of the journal cross whose arm is received in the journal therein. Thus, the arm 134 has a generally planar web portion 134a and a pair of spaced-apart flange portions 134b and 134c which extend generally perpendicularly outwardly from the web portion 134a and which are generally parallel to each other. Further, each of the arms 134 and 136 is provided with an enlarged end portion, designated, respectively, by reference numerals 138 and 140, the end portions 138 and 140, respectively, having half-cylindrical bores 142 and 144 therein for receiving the annular bearings, not shown, which permit the pivoting the arms of a journal cross (not shown) therein. The half-cylindrical bores 142 and 144 are closed, after the insertion of the bearings therein, by straps 146 and 148 which have, respectively, half-cylindrical center portions 146a and 148a which, respectively, form cylindrical bearing recesses with the half-cylindrical bores 142 and 144. As is shown in FIG. 12 in connection with the arm 136 of the yoke 130, the strap 146 is disengageably secured to the arm 136 by threaded fasteners 150 and 152 which are threadably received in tapped holes 154 and 156 of the arm 136. While not shown, the strap 148 attaches to the arm 136 in a similar manner.

Although a preferred embodiment of this invention has been described and illustrated therein, the following claims are intended to cover various other embodiments which fall within the spirit and scope thereof.

I claim:
1. A universal joint comprising:
   a journal cross, said journal cross having;
      a first pair of opposed, coaxial arms lying along a first axis;
      a second pair of opposed, coaxial arms, said second pair of opposed, coaxial arms lying along a second axis which extends perpendicular through said first axis at an intersection;
      said journal cross further having a central axis of rotation which extends perpendicularly to each of said first axis and said second axis and through said intersection; and
   a ferrous metal yoke, said yoke conprising;
      a hub having a central axis and an end; and
      first and second arms extending from said end of said hub on opposite sides of said central axis of said yoke, said first and second arms being spaced apart from one another, said yoke being formed integrally in a single piece;
      each of said first and second arms having an opening therein pivotably receiving one of said first pair of opposed arms of said journal cross;
      said each of said first and second arms having a portion between said end of said hub and the opening in said each of said first and second arms which is C-shaped in cross-section, said portion having a generally planar web portion and first and second flanges extending generally perpendicularly outwardly from said generally planar web portion and generally parallel to each other, said each of said first and second arms having a shear center which lies along an axis that is positioned between said central axis of said yoke and said generally planar web portion of said portion of said each of said first and second arms;
      said each of said first and second arms and said one of said first pair of opposed arms of said journal cross that is pivotably received therein having substantially corresponding free deflection characteristics under a torsional load applied around one of said central axis of said journal cross and said central axis of said hub of said yoke; and
      rotatable means which is rotatable about a central axis that intersects said central axis of said yoke pivotably receiving each of said second pair of opposed, coaxial arms of said journal cross, whereby torque may be transmitted from one of said yoke and said rotatable means through said journal cross to the other of said yoke and said rotatable means.

2. A universal joint according to claim 1 wherein said yoke is formed integrally in a single piece by casting.

3. A universal joint according to claim 2 wherein said yoke is formed from iron.

4. A universal joint according to claim 1 wherein said yoke is formed integrally in a single piece from steel by forging.

5. A universal joint according to claim 1 wherein said hub of said yoke is annular in configuration.

6. A universal joint according to claim 5 wherein said hub has an internal spline portion.

7. A universal joint according to claim 1 wherein said hub of said yoke comprises an annular portion and a web extending transversely across said annular portion at said end.

* * * * *